(12) United States Patent
Sone et al.

(10) Patent No.: US 8,394,506 B2
(45) Date of Patent: Mar. 12, 2013

(54) HELICAL SUBSTITUTED POLYACETYLENE STRUCTURE, METHOD FOR PRODUCING THE SAME, DEVICE STRUCTURE, ION TRANSPORT FILM AND GAS SEPARATION FILM

(75) Inventors: Takeyuki Sone, Tokyo (JP); Akira Kuriyama, Atsugi (JP); Otto Albrecht, Atsugi (JP); Koji Yano, Cambridge (GB)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 12/041,526

(22) Filed: Mar. 3, 2008

(65) Prior Publication Data
US 2008/0220258 A1  Sep. 11, 2008

(30) Foreign Application Priority Data
Mar. 9, 2007  (JP) ................. 2007-060936

(51) Int. Cl.
C08F 10/14 (2006.01)
B32B 9/04 (2006.01)
B32B 37/00 (2006.01)

(52) U.S. Cl. ..... 428/523; 428/500; 428/512; 526/348.3; 156/60

(58) Field of Classification Search ........................ None
See application file for complete search history.

(56) References Cited

U.S. PATENT DOCUMENTS

| 3,645,999 A * | 2/1972 | Byrd ............................. 525/373 |
| 5,538,811 A | 7/1996 | Kanbara et al. |
| 6,809,955 B2 | 10/2004 | Bulovic et al. |
| 2008/0099129 A1 | 5/2008 | Kuriyama et al. |
| 2009/0179197 A1 | 7/2009 | Sone et al. |

FOREIGN PATENT DOCUMENTS

| JP | 62-227411 | 10/1987 |
| JP | 2002-334702 | 11/2002 |
| JP | 2003-110110 A | 4/2003 |
| JP | 2003-142098 | 5/2003 |
| JP | 2004-256690 | 9/2004 |
| JP | 2005-524967 A | 8/2005 |
| JP | 2008-84979 A | 4/2008 |
| WO | WO 2004029111 A1 * | 4/2004 |
| WO | 2008-047586 | 4/2008 |

OTHER PUBLICATIONS

Darren M. Jones, et al., "Variable Adhesion of Micropatterned Thermoresponsive Polymer Brushes: AFM Investigations of Poly(N-isopropylacrylamide) Brushes Prepared by Surface-Initiated Polymerizations", Adv. Mater., vol. 14, No. 16, Aug. 16, 2002, pp. 1130-1134.

* cited by examiner

*Primary Examiner* — John J Figueroa
(74) *Attorney, Agent, or Firm* — Fitzpatrick, Cella, Harper & Scinto

(57) ABSTRACT

A helical substituted polyacetylene structure including a substrate and a substituted polyacetylene with a periodic main chain having a helical periodic structure, wherein the substituted polyacetylene is disposed inclined on the surface of the substrate with the inclination angle between the main helical axis of the substituted polyacetylene and the surface of the substrate falling in a range of 60° or more and 90° or less. A device structure in which a first electrode, the substituted polyacetylene with the periodic main chain having a helical periodic structure and a second electrode are sequentially disposed on a substrate.

9 Claims, 10 Drawing Sheets

HELICAL SUBSTITUTED POLYACETYLENE STRUCTURE, METHOD FOR PRODUCING THE SAME, DEVICE STRUCTURE, ION TRANSPORT FILM AND GAS SEPARATION FILM

BACKGROUND OF THE INVENTION

1. Field of the Invention

The present invention relates to a helical substituted polyacetylene structure, a method for producing the same, a device structure using the polyacetylene structure, an ion transport film using the polyacetylene structure and a gas separation film using the polyacetylene structure.

2. Description of the Related Art

Under the circumstances that integration of electronic circuits is being progressed, organic devices using conductive organic materials such as organic semiconductors have currently attracted a great deal of attention. Organic devices have such advantages that organic devices are flexible, and if processes from solutions are feasible, inexpensive manufacturing of devices is enabled and processes applicable to large areas are enabled. Organic semiconductors include low molecular weight organic semiconductors such as pentacene and polymer semiconductors such as polythiophene. Polymer semiconductors are particularly compatible with solution processes, and hence attract attention as conductive materials suitable for large area processes and inexpensive processes. In particular, applications of substituted polyacetylenes to electronics materials have attracted attention; Japanese Patent Application Laid-Open Nos. 2004-256690 and 2003-142098 disclose that substituted polyacetylenes can be applied to conductive materials, EL elements, secondary batteries and the like.

Additionally, systems in which polyethers such as polyethylene oxide (PEO) and polypropylene oxide (PPO) are mixed with lithium salts or borates have hitherto been reported as ion conductive solid electrolytes to be used in electrochemical devices such as secondary batteries (U.S. Pat. No. 5,538,811); and polymers having sulfonic acid groups or carboxylic acid groups have been reported as proton conductive films (Japanese Patent Application Laid-Open No. 2002-334702).

The mechanism involved in the above-mentioned ion transport is a transport mechanism in which ions dissociated by being coordinated to polar group portions migrate by undergoing ligand exchange accompanied by the segment motion of the molecular chain. In this case, there is a problem that the conductivity of the electrolyte ion to be carrier is significantly affected by the segment motion of the polymer chain due to heat so as to be largely dependent on temperature, and hence the ion conductivity at low temperatures is degraded. Additionally, the transport mechanism concerned is a mechanism in which the transport is based on hopping over random polar group portions and hence cannot be said to be efficient.

Additionally, the production of oxygen enrichment films has hitherto been attempted for the purpose of obtaining high concentration oxygen from air. In this case, air is approximately assumed as a mixed gas composed of oxygen and nitrogen, the permeability coefficient ratio between nitrogen and oxygen ($RO_2/RN_2$) is used as the separation coefficient, and there has been demanded a material in which a high separation coefficient and a high oxygen permeability coefficient are compatible with each other.

Recently, there have been studied gas separation films which selectively separate gases by using films of polymers such as polysiloxane, and oxygen enrichment films are hoped for in the applications such as medical applications. Among such films, films of disubstituted polyacetylenes such as poly(trimethylsilylpropyne) and poly(trimethylsilyldiphenylacetylene) attract attention because these films each have a high oxygen permeability coefficient and a high separation coefficient (Japanese Patent Application Laid-Open No. S62-227411). However, even the performances of such films are not sufficient for practical applications, and there is a problem that due to the variation with time of the oxygen permeation, no stable separation performance can be maintained. Accordingly, the advent of polymer films being more stable in variation with time and having higher separation/permeation performances has been anticipated.

Additionally, there has been reported a technique in which a polymer is grown on a basal plate in a direction perpendicular to the basal plate by bonding a catalyst to the basal plate and by providing the thus processed basal plate with a monomer (Advanced Materials, Vol. 14, p. 1, p. 1130). It may be assumed that there can be obtained by using this technique a film in which the molecules are oriented in the film direction; however, the molecule involved is a polyolefin polymer molecule having a flexible main chain, and hence the orientation and the crystallinity of the film cannot necessarily be said to be high.

SUMMARY OF THE INVENTION

Devices using organic semiconductors are generally lower in mobility as compared to inorganic semiconductors using materials such as silicon, and hence improvement of the operation speed of devices including organic semiconductors comes out as a problem. Organic semiconductors have defects at the bent portions of the involved molecules and demand hopping for conduction, and hence the migration of the charge transport carriers to transport charges such as electrons and holes is inhibited to result in the decrease of the mobility in organic semiconductors. As advantageous effects that may be expected, the involved molecules are made straight in shape so as to improve the operation speed and accordingly to eliminate the above-described effects, and the migration length of the charge transport carrier is reduced to increase the operation speed.

In a method in which the migration length of the charge transport carrier is reduced, as described in Japanese Patent Application Laid-Open No. 2003-110110, an organic semiconductor thin film is formed on an electrode disposed on a basal plate, and a second electrode is further formed on the organic semiconductor thin film. Accordingly, there is disclosed a device in which by making current flow in the direction of the thickness of the organic thin film, the migration length of the charge transport carrier is made shorter than that in conventional planar configurations of elements, namely, a vertical-type organic device. According to this method, the distance between the electrodes is determined by the thickness of the organic film so as not to necessitate nano level lithography.

The present invention provides a helical substituted polyacetylene structure in which a substituted polyacetylene is disposed inclined in such a manner that the inclination angle between the main helical axis of the substituted polyacetylene and the surface of a substrate falls in a range of 60° or more and 90° or less.

The present invention provides a highly efficient device structure in which the helical substituted polyacetylene structure is disposed between electrodes.

Additionally, the present invention provides, by using the helical substituted polyacetylene structure, an ion transport film having sufficient ion conductivity even at low temperatures.

Additionally, the present invention provides, by using the helical substituted polyacetylene structure, a gas separation film to efficiently separate gases in the film thickness direction.

A helical substituted polyacetylene structure to solve the above-described problems is a structure including a substrate and a substituted polyacetylene with a periodic main chain having a helical periodic structure, wherein the substituted polyacetylene is disposed inclined on a surface of the substrate in such a manner that the inclination angle between the main helical axis of the substituted polyacetylene and the surface of the substrate falls in a range of 60° or more and 90° or less.

In the helical substituted polyacetylene structure according to the present invention, the substituted polyacetylene may be used as a monomolecular film or as a multilayer film in which monomolecular films are laminated.

A device structure to solve the above-described problems is a device structure in which a first electrode, the substituted polyacetylene with a periodic main chain having a helical periodic structure and a second electrode are sequentially disposed on a substrate, wherein the substituted polyacetylene is disposed inclined in such a manner that the inclination angle between the main helical axis of the substituted polyacetylene and the surface of the substrate falls in a range of 60° or more and 90° or less.

An ion transport film to solve the above-described problems is an ion transport film using the substituted polyacetylene structure.

A gas separation film to solve the above-described problems is a gas separation film using the substituted polyacetylene structure.

Additionally, a method for producing the helical substituted polyacetylene structure of the present invention includes forming a molecular spread film in which a substituted polyacetylene with a periodic main chain having a helical periodic structure is spread inclined on a water surface in such a manner that the inclination angle between the main helical axis of the substituted polyacetylene and the water surface falls in a range of 60° or more and 90° or less, and transferring the substituted polyacetylene to the substrate from the molecular spread film.

Additionally, the method for producing the helical substituted polyacetylene structure of the present invention includes polymerizing a monomer in a direction in which a substituted polyacetylene with a periodic main chain having a helical periodic structure is disposed inclined in such a manner that the inclination angle between the main helical axis of the substituted polyacetylene and the surface of the substrate falls in a range of 60° or more and 90° or less.

Additionally, the method for producing the helical substituted polyacetylene structure of the present invention includes polymerizing a monomer, by using as a catalyst a rhodium complex bonded to the surface of a substrate, in a direction in which a substituted polyacetylene with a periodic main chain having a helical periodic structure is disposed inclined in such a manner that the inclination angle between the main helical axis of the substituted polyacetylene and the surface of the substrate falls in a range of 60° or more and 90° or less.

It is to be noted that in the present invention, the direction of the main helical axis of the substituted polyacetylene in which the inclination angle between the main helical axis of the substituted polyacetylene and the surface of the substrate falls in a range of 60° or more and 90° or less is referred to as "perpendicular or approximately perpendicular" as the case may be.

The present invention further provides a fundamental structure of the vertical-type organic device in which the operation speed is further improved.

Additionally, when in a separation film using an ordered structure, the conduction paths of a substance to be separated are randomly oriented with respect to or perpendicular to the permeation direction of the substance to be separated, namely, the thickness direction of the separation film, the selective separation property of the separation film cannot be fully made use of. When the conduction paths of a substance to be transported are oriented in the permeation direction of the substance to be transported, namely, oriented to be perpendicular or approximately perpendicular to the film surface as this is the case in the gas separation film or the ion transport film of the present invention, the film can be a gas separation film or an ion transport film which makes use of the selective separation property of the functional sites present in the film structure.

In the helical substituted polyacetylene gas separation film of the present invention, the gas conduction paths can be controlled to be perpendicular or approximately perpendicular to the film surface and the free volume of the film can be controlled by the side chains, and hence a higher gas separation capacity can be expected on the basis of a gas separation mechanism different from conventional mechanisms. Because the free volume of the film can be controlled by varying the side chain length of the helical substituted polyacetylene molecule used in the present invention, a design adapted to the target gas can be made.

Additionally, in the helical substituted polyacetylene ion transport film of the present invention, the carrier ion conduction paths can be controlled to be perpendicular or approximately perpendicular to the film surface, and hence an efficient conductivity can be expected on the basis of an ion conduction different in mechanism from conventional ion conductions. In this transport film, carrier ions preferentially pass through the side chain portions which are polar components, and the polar components, namely, the sites to coordinate the carrier ions are present in high density in the conduction paths of the carrier ions, and hence an efficient ion transport can be expected. Additionally, this ion transport mechanism is not affected by the segment motion, and hence the ion transport film concerned can be expected to have sufficient ion conductivity even at low temperatures.

The present invention can provide a helical substituted polyacetylene structure in which the substituted polyacetylene is disposed inclined in such a manner that the inclination angle between the main helical axis of the substituted polyacetylene and the surface of the substrate falls in a range of 60° or more and 90° or less.

The present invention can provide a highly efficient device structure in which the helical substituted polyacetylene structure is disposed between electrodes.

Additionally, the present invention can provide, by using the helical substituted polyacetylene structure, an ion transport film having sufficient ion conductivity even at low temperatures.

Additionally, the present invention can provide, by using the helical substituted polyacetylene structure, a gas separation film to efficiently separate gases in the film thickness direction.

Further features of the present invention will become apparent from the following description of exemplary embodiments with reference to the attached drawings.

DESCRIPTION OF THE EMBODIMENTS

Hereinafter, the present invention is described in detail.

Figure 12:
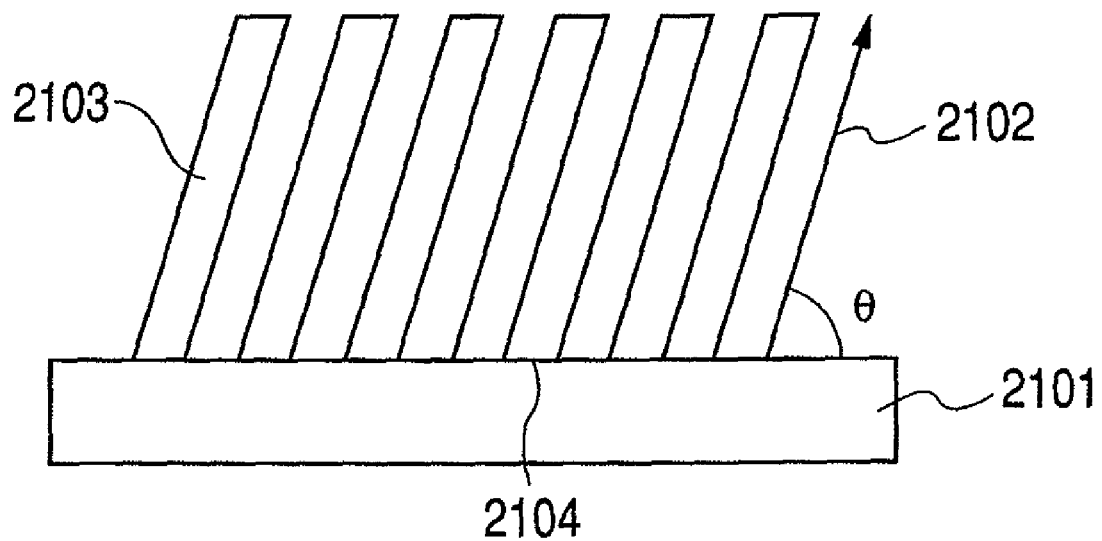
FIG. 12 is a schematic view illustrating another embodiment of the helical substituted polyacetylene structure of the present invention.

FIG. 12 is a schematic view illustrating an embodiment of a helical substituted polyacetylene structure of the present invention. In this figure, the helical substituted polyacetylene structure of the present invention is a structure comprising a substrate 2101 and a substituted polyacetylene 2103 with a periodic main chain having a helical periodic structure, wherein the substituted polyacetylene 2103 is disposed inclined in such a manner that the inclination angle θ between the main helical axis 2102 of the substituted polyacetylene 2103 and the surface 2104 of the substrate 2101 falls in a range of 60° or more and 90° or less.

The helical substituted polyacetylene used in the present invention is expected as a next-generation conjugated polymer that is different from conventional conjugated polymers from the viewpoints of the stereoregular structure thereof, the helical structure thereof and the self-assembled structure thereof. In the helical substituted polyacetylene, the main chain thereof having alternate double bonds has the same primary structure as the main chains of non-helical substituted polyacetylenes; however, the helical substituted polyacetylene has substituents larger than hydrogen, and hence the main chain thereof does not form a planar structure but forms a sterically twisted structure.

Figure 1:
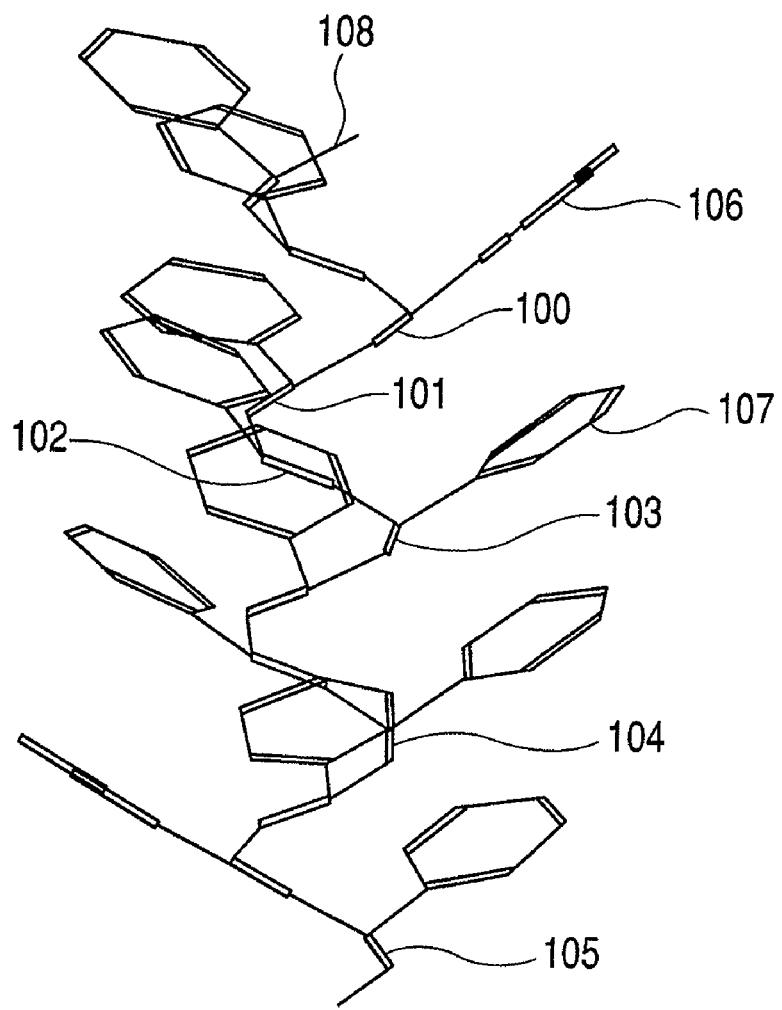
FIG. 1 is a view illustrating the structure of a helical substituted polyacetylene in the present invention.
Figure 1:
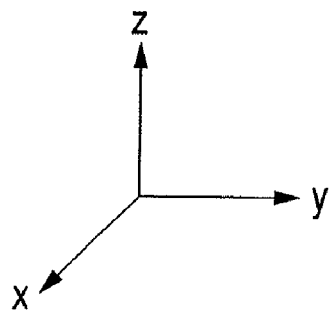
Figure 2:
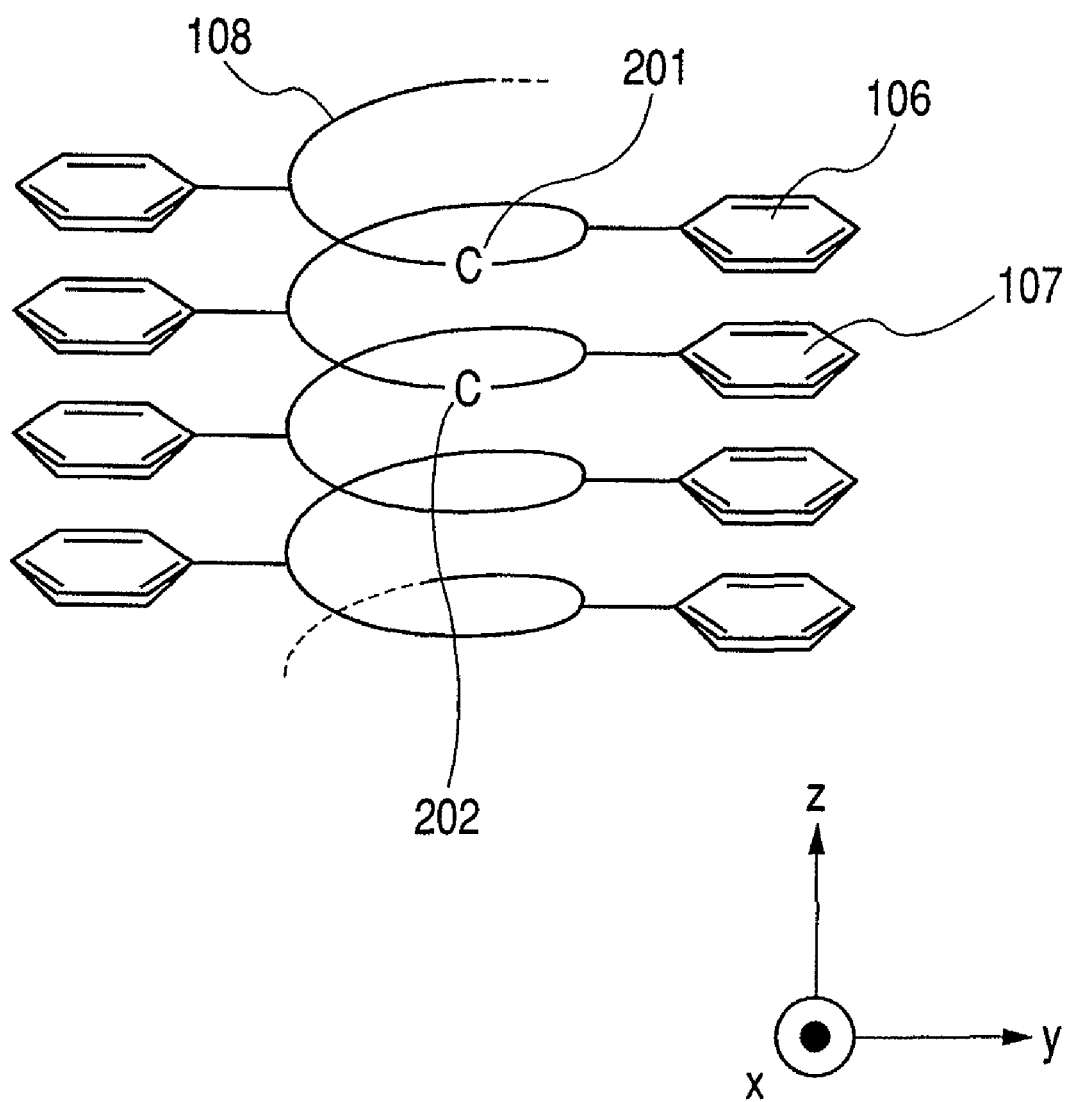
FIG. 2 is a view illustrating the structure of the helical substituted polyacetylene in the present invention.
Figure 3:
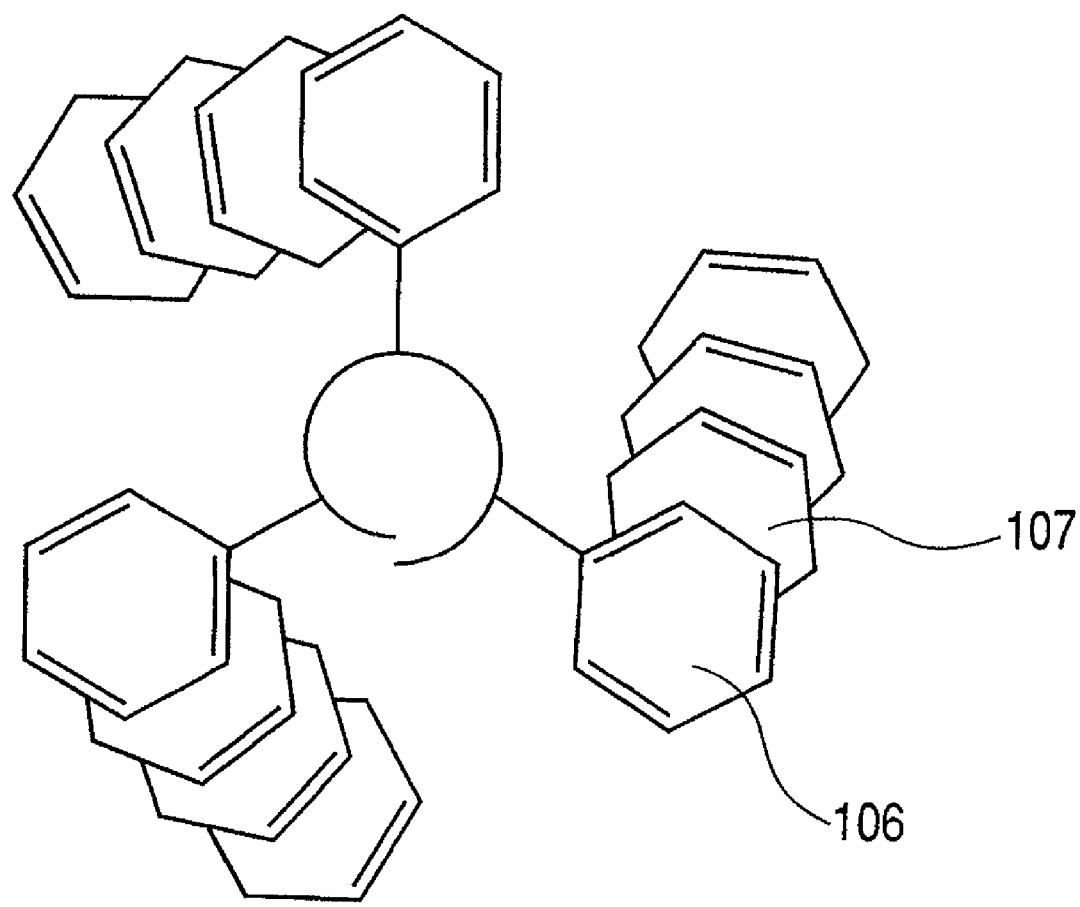
FIG. 3 is a view illustrating the structure of the helical substituted polyacetylene in the present invention.
Figure 3:
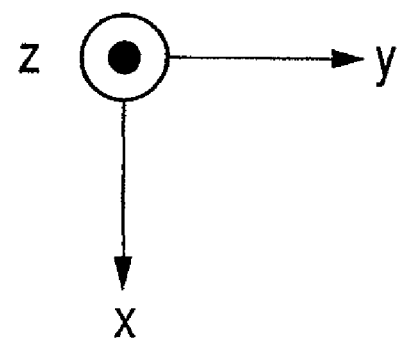

The structure of the helical substituted polyacetylene used in the present invention is illustrated in FIGS. 1 to 3. As illustrated in FIG. 1, the main chain forms a helical structure in which alternate double bonds are twisted, and the helical structure is a structure close to a 3/1 helix in which three units consisting of a double bond 100, a double bond 101 and a double bond 102 make approximately one helical turn (Macromol. Chem. Phys., 203, pp. 66-70 (2002)). In this structure, a double bond 103 at one helical turn from the double bond 100 is disposed approximately parallel to the double bond 100 with a spacing of approximately 0.5 nm (5 Å) or less, and more typically, from 0.2 nm to 0.4 nm (from 2 Å to 4 Å). Similarly, the double bond 103 and the double bond 104 are disposed one above the other with the helical periodic spacing so as to be parallel to each other, and this is also the case for the double bond 104 and the double bond 105.

In FIG. 2, the main chain 108 including the double bonds 100 to 105 are shown in a helical form for the sake of easy understanding. Although FIG. 2 depicts, for the sake of avoiding complexity, that two side chains bonded to the main chain are involved in every one helical turn period of the main chain, three side chains are involved in every approximately one helical turn period in the actual structure as shown in FIG. 1. In FIG. 2, the carbon atom 201 and the carbon atom 202 are the two carbon atoms included in the main chain 108, and these two carbon atoms are located so as to be separated from each other approximately by one helical turn period in the helical structure of the main chain 108 in such a way that there is formed a structure that looks laminated along the z direction shown in the figure. Further, FIG. 3 illustrates the structure of the helical substituted polyacetylene molecule used in the present invention as viewed along the z direction. In the helical substituted polyacetylene used in the present invention, the above-described periodic structure is realized over a long distance. Such a distance typically extends from 5 nm to 10 μm, and in such a region of distance, the shape of the whole molecule takes on a shape linear in the z direction shown in the figure.

In general, it has been known that a stereoregular polyacetylene molecule forms a helical structure; however, such a helical structure does not form a periodic structure over a long distance. The helical substituted polyacetylene used in the device structure according to the present invention has a helical structure having a periodic spacing of the order of the distance over which π electron orbitals mutually overlap, and more specifically a periodic spacing of 0.5 nm (5 Å) or less, and more typically from 0.2 nm to 0.4 nm (from 2 Å to 4 Å). Additionally, such a periodic structure is formed over a long distance, typically, over a distance from 5 nm to 10 μm.

In the above-described helical substituted polyacetylene, the side chain substituents 106 and 107 are disposed parallel to each other with the helical periodic spacing as illustrated in FIGS. 1 to 3, and similarly other substituents are also disposed one above the other in the main chain direction, namely, the z direction so as to be parallel to each other with the helical periodic spacing.

Hereinafter, the helical substituted polyacetylene used in the present invention is described in more detail. As the structure of the helical substituted polyacetylene, a structure shown in the following formula 1 may be cited.

(formula 1)

In the above formula, X and Y each represent a substituent having a chain or cyclic hydrocarbon, and additionally, a substituent having a heteroatom or a metal atom. In the formula, examples of X include a substituted aromatic ring, an unsubstituted aromatic ring, a heteroaromatic ring, a carbonyl bond, an ester bond, an ether bond, a carbonate bond, an amide bond, an imino bond, a urethane bond, a phosphate bond, a thioether bond, a sulfinyl group, a sulfonyl group, an amino group, a silyl group, an alkylene oxide chain having any length, and other cyclic or chain hydrocarbons. X may be substituted with a single Y, or with a plurality of one and the same Y or a plurality of different Ys.

Additionally, in the formula, examples of Y include, in addition to the chemical species specified above for X, a halogen atom, a hydroxy group, a carboxyl group, a nitro group, a cyano group, a vinyl group and an ethynyl group. Additionally, Y may be substituted with the same chemical species as mentioned above.

Examples of the structure of the helical substituted polyacetylene may include a copolymer produced by polymerizing different types of monomers as well as a polymer, having a single structure, produced by polymerizing one type of monomer. Examples of the structure of the copolymer include a random copolymer randomly including individual monomer units and a block copolymer including connected structural units each having a certain length. In such a copolymer structure, different types of monomer structures can be combined, and a plurality of functions can be imparted to a molecule.

The size of the helical substituted polyacetylene is such that the number average degree of polymerization falls in a range from 50 to 100,000.

As a synthesis of the helical substituted polyacetylene, the helical substituted polyacetylene can be obtained by a polymerization reaction of an acetylene compound represented by the following formula 1A with a transition metal complex as a catalyst.

$$HC\equiv C-X-(Y)_n \qquad \text{(formula 1A)}$$

In the above formula, X and Y each represent a substituent formed of a chain hydrocarbon or a cyclic hydrocarbon, or a functional group having a heteroatom or a metal atom. The number n represents the number of the functional groups substituted for the hydrogen atoms bonded to X, and the value of n is an integer of 1 to 20.

Examples of the transition metal complex include rhodium compounds such as rhodium (norbornadiene) chloride dimer ([Rh(NBD)Cl]$_2$) and rhodium (cyclooctadiene) chloride dimer ([Rh(COD)Cl]$_2$) (Macromol. Chem. Phys., 200, pp. 265 to 282 (1999)). Examples of the cocatalyst include amines, lithium compounds and phosphorus compounds. Additionally, in addition to the rhodium complex dimmers, rhodium complex monomers such as Rh[C(C$_6$H$_5$)=C(C$_6$H$_5$)$_2$] (NBD) ((C$_6$H$_5$)$_3$P).

Examples of the solvent include solvents such as chloroform, tetrahydrofuran and toluene; in particular, chloroform and toluene are preferably used. These solvents can be used each alone or as mixtures thereof.

Figure 5:
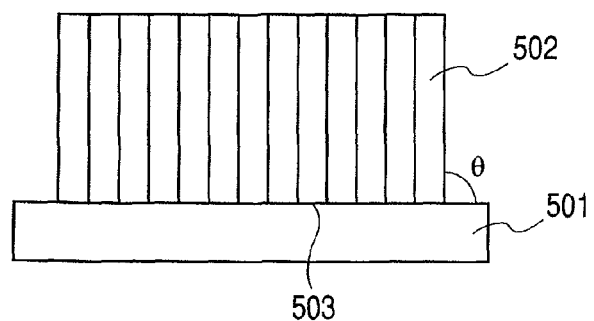
FIG. 5 is a schematic view illustrating an embodiment of the helical substituted polyacetylene structure of the present invention.

Examples of the method for producing the helical molecular structure of the present invention include a method shown in FIG. 5 in which a polymer is synthesized on a basal plate 501 so as to extend along a direction perpendicular or approximately perpendicular to the basal plate.

Figure 4:
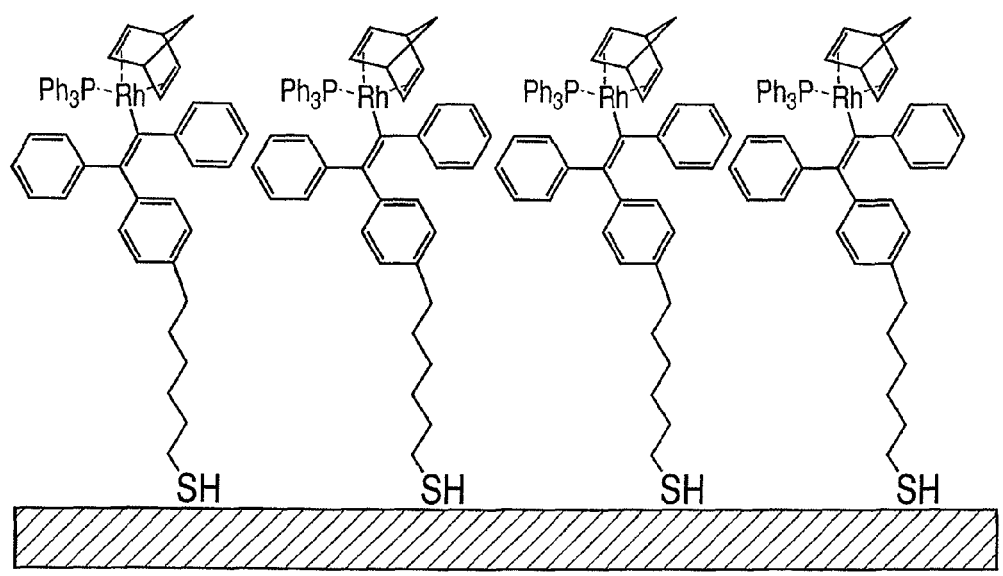
FIG. 4 is a schematic view illustrating an embodiment of a method for producing a helical substituted polyacetylene structure of the present invention.

For example, here is cited a method in which by immersing a gold basal plate into a solution of a rhodium complex, Rh[C(C$_6$H$_5$)=C(C$_6$H$_5$)(C$_6$H$_4$(CH$_4$)$_6$SH)] (NBD) ((C$_6$H$_5$)$_3$P), containing alkylthiol-substituted triphenylvinyl as a ligand, a monomolecular film of the rhodium complex is formed as shown in FIG. 4, and successively polymerization is started by adding a solution of phenylacetylene as monomer. After the elapse of the polymerization reaction time, the solution is removed, the basal plate is washed and dried, and thus a polyphenylacetylene film grown from the gold basal plate is obtained. No particular limitation is imposed on the technique for linking the catalyst to the substrate, and examples of such a technique include, in addition to the combination of gold and a sulfur-containing functional group such as the above-described gold-thiol bonding, a combination of a halogenated silane and glass and a combination of a hydrogen bonding functional group on a basal plate surface and a catalyst provided with a hydrogen bonding functional group.

A similar technique is disclosed in, for example, Advanced Materials, Vol. 14, p. 1, p. 1130. This technique can be applied to various shapes of substrates such as particles as well as a basal plate.

Additionally, as shown in FIG. 5, there is a technique in which a helical molecule is disposed on the substrate 501 so as for the main helical axis of the molecule 502 to be perpendicular or approximately perpendicular to the substrate 501. More specifically, for example, a technique using the LB method may be cited.

For example, by introducing as the ligand of the rhodium complex catalyst a hydrophilic moiety such as a triphenylvinyl group having an ammonium salt, the polymerization terminal can be modified to be a hydrophilic group, and a functional-terminated polymer thus obtained is expected to exhibit amphiphilicity.

Alternatively, by block copolymerizing a monomer having a hydrophilic substituent introduced therein and a monomer having a hydrophobic substituent introduced therein, an amphiphilic helical substituted polyacetylene is obtained. Examples of such a hydrophilic group include polar functional groups such as an alkylene oxide, an ammonium salt and a sulfonium salt. Examples of such a hydrophobic substituent include an alkyl group, an aromatic ring and a halogenated alkyl group.

When a solution of an amphiphilic polymer obtained by one of these methods is spread on a water surface, the molecules of the polymer are disposed on the water surface with the hydrophilic ends oriented one above the other. Under this condition, the molecules are compressed on the water surface so as to form a two-dimensional film, and then this film is transferred onto a basal plate to yield a film in which the molecules are oriented perpendicular to the basal plate. In this case, for the purpose of obtaining a neat film on the water surface, it is necessary to use a short and rigid molecule.

In the structure of the present invention, as originating from the regular main chain helical structure with orientation perpendicular or approximately perpendicular to the substrate surface, the side chains can be disposed regularly, and various functions are expected to be exhibited by varying the side chain structure. No particular limitation is imposed on the shape and material of the substrate, and any substrate may be adopted as long as the substrate supports helical molecules so as to be perpendicular or approximately perpendicular to the substrate surface. Examples of the substrate shape include a granular shape, a basal plate-like shape and a linear shape. In particular, when helical molecules are disposed on a basal plate, there are obtained structures that can be easily applied to electronic devices, separation films for various substances and other devices. Examples of the substrate material include glass, silicon and metals, and such materials may be coated with organic substances or metals.

Figure 6:
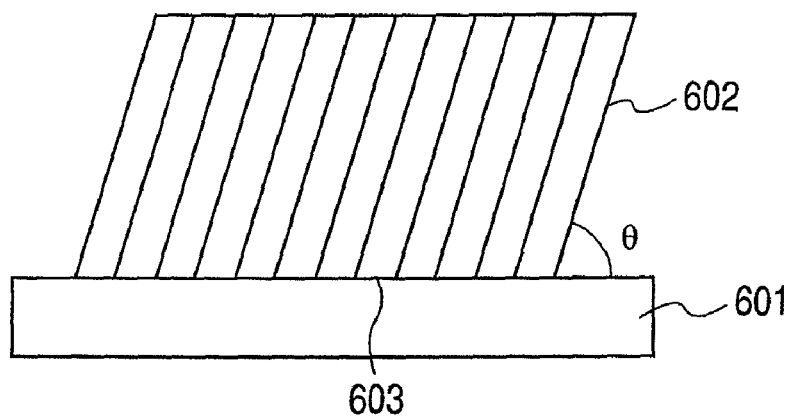
FIG. 6 is a schematic view illustrating another embodiment of the helical substituted polyacetylene structure of the present invention.

In particular, in a helical molecular structure oriented perpendicular or approximately perpendicular onto a basal plate, the molecules are oriented perpendicular or approximately perpendicular relative to the film surface, and regular structures in each of which the side chains of the helical molecule are laminated penetrate in the film thickness direction. Accordingly, the functionality originating from the side chains effectively operates particularly in the film thickness direction, the anisotropy of the functionality of the structure between the film surface direction and the film thickness direction becomes large. In the present invention, as shown in FIG. 5, the angle between the surface 503 of the substrate 501 and the main axis of the helical molecule 502 is not necessarily 90°, and as shown in FIG. 6, the helical molecule 602 is obliquely inclined relative to the substrate surface 603 as the case may be. Even in such a case, the laminated structure of the side chains penetrates from the upper surface to the lower surface of the film, and hence the specific functionality of the film is not lost; the helical molecular structure oriented perpendicular or approximately perpendicular onto the basal plate is expected to have a significant functionality in the direction perpendicular or approximately perpendicular to the film surface.

Figure 7:
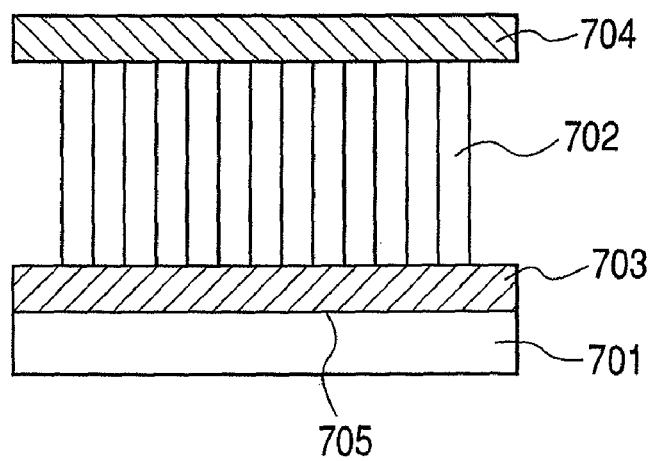
FIG. 7 is a schematic view illustrating an embodiment of a device structure of the present invention.
Figure 7:
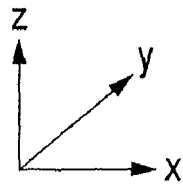
Figure 8:
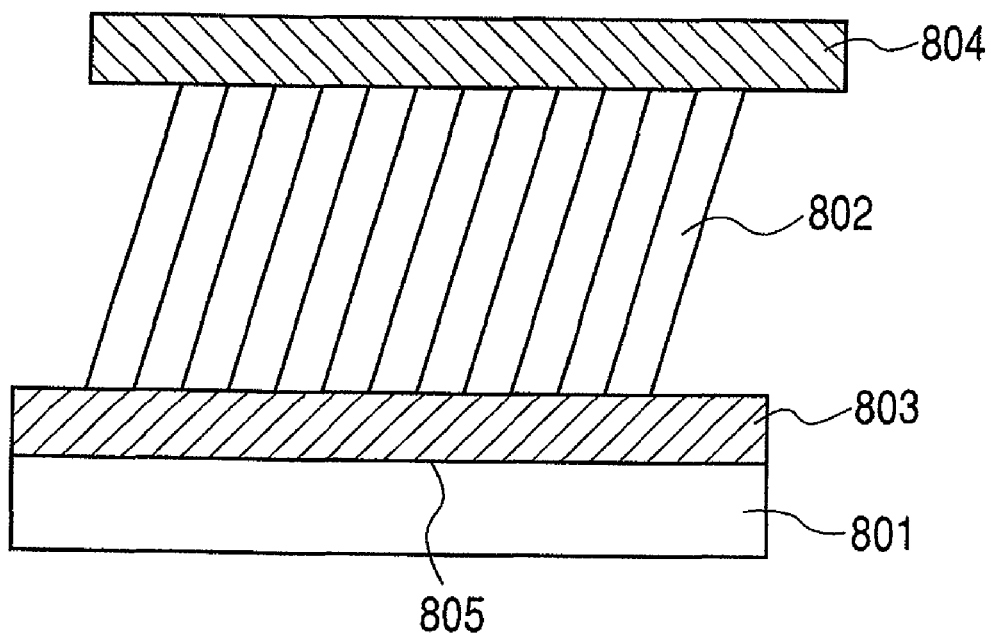
FIG. 8 is a schematic view illustrating another embodiment of the device structure of the present invention.
Figure 8:
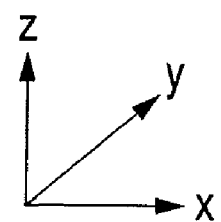

For example, in case of a device structure in which electrodes are provided on the upper surface and the lower surface of a helical molecular film, in particular, in a case where the helical molecule 702 is oriented perpendicular to the substrate surface 705 as shown in FIG. 7, and even in a case where the helical molecule 802 is inclined to the substrate surface 805 as shown in FIG. 8 wherein the both ends of the helical molecule 802 are bonded to the upper and lower electrodes 801 and 803, the devices in both particular cases each operate as a one-molecule device, and are expected to be rapid and efficient electronic devices.

Organic semiconductors may be classified into low molecular weight organic semiconductors such as pentacene and polymer organic semiconductors such as polythiophene. Polymer semiconductors are well compatible with solution processes, such solution processes attracting attention as large area processes and low-cost processes. In the present invention, a polymer is disposed on an electrode disposed parallel to the basal plate so that it may be perpendicular or approximately perpendicular to the basal plate, and thus the polymer, which is linear, is disposed between electrodes to improve the operation speed of the device. In this case, by using as the polymer the helical substituted polyacetylene, a device structure using a linear molecule is actualized.

FIG. 7 illustrates a structure of the device according to the present invention. In FIG. 7, a substrate 701 is a basal plate of the present device; the basal plate may be a Si basal plate with an oxide film attached thereon as in conventional semiconductor devices, and may also be a flexible basal plate because an organic semiconductor is used in the present invention.

An electrode 703 is an electrode formed on the substrate 701, examples of such an electrode including a gold (Au) electrode. This electrode may be produced by using a conventional lithography method; however, production of this electrode by using an imprint method enables to reduce the production cost. The polymer 702 is a polymer grown on the electrode 703, and is a conductive polymer or a polymer semiconductor. An electrode 704 is an electrode formed on the polymer 702 and forms a pair with the electrode 703 so as to apply voltage or current to the polymer 702. The polymer 702, for which a linear polymer is used, is disposed so as for the main axis of the polymer 702 to be perpendicular to the surface of the electrode 703. It is to be noted that the term, the main axis of a molecule, as referred to in the present invention means the direction parallel to the whole linear shape of the molecule, as shown by the z axis in the figure for the polymer 702 in FIG. 7.

The distance between the electrode 704 and the electrode 703 is not determined by lithography, but is determined by the length of the polymer 702, and accordingly there are advantages such that short inter-electrode distances can be achieved more readily than lithography, and shorter inter-electrode distances can be achieved than by production with lithography.

In general, conductive polymers exhibit strong conductivity in the molecular main axis direction. In the structure shown in FIG. 1, a stronger conductivity is exhibited in the shown z direction than in the shown x and y directions. In the present invention, the electrodes are disposed on both ends of the direction to be the main axis direction of the polymer 702, and hence the current flows in the direction in which the polymer has the stronger conductivity. Consequently, as compared to simple production of perpendicularly oriented organic devices, there can be actualized devices higher in conductivity and fast in operation speed or devices higher in current density.

The helical substituted polyacetylene used as the polymer 702 enables to actualize the structure illustrated in FIG. 7, and additionally can actualize devices higher in rigidity and more excellent in conductivity and controllability as compared with devices produced with other polymers.

Further, in the present invention, the inter-electrode distance is determined by the polymer length, and hence there are advantages that the present invention can control the inter-electrode distance more precisely and can achieve shorter inter-electrode distances than methods in which thin films are formed simply by coating electrodes with polymers.

Additionally, the helical molecule 702 may be a polymer the whole of which is synthesized from one and the same monomer, or a polymer in which polymers different in structure are connected, namely, a block polymer. By connecting blocked polymers different in electronic properties, structures different in electronic property can be disposed in a controlled manner in the z direction shown in FIG. 7, namely, in the direction in which electrons and holes flow. In this case, the lengths of the individual blocks are determined by polymer synthesis, and accordingly there is an advantage that the lengths associated with the individual functions can be accurately controlled.

Additionally, the ion transport film of the present invention is a film wherein a helical substituted polyacetylene having polar group portions in the side chains is oriented perpendicular or approximately perpendicular to the basal plate, and accordingly ions are efficiently transported in the film thickness direction.

Figure 9:
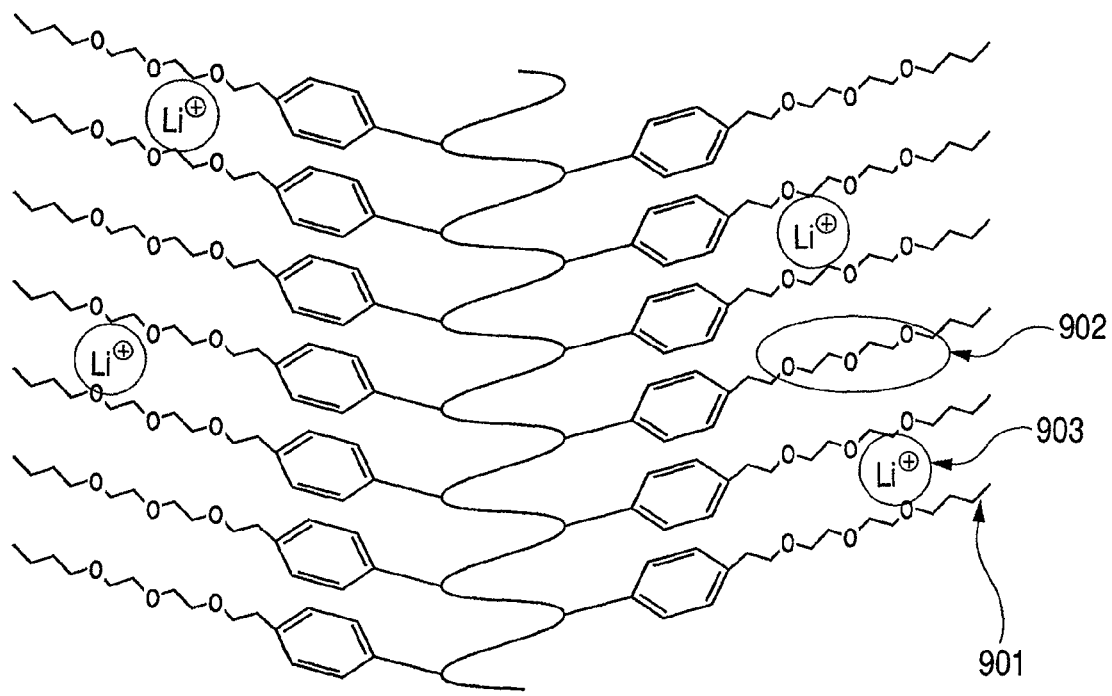
FIG. 9 is a schematic view illustrating an embodiment of an ion transport film of the present invention.

As illustrated in FIG. 9, side chains 901 are regularly disposed as originating from the regular helical structure of the main chain, and hence the segment motion of the side chains 901 efficiently contributes to the ion transport. It may be interpreted that in this structure, in addition to an ion transport mechanism in which carrier ions 903 are transported by segment motion, there is an ion transport mechanism in which the carrier ions 903 migrate in a manner hopping over regularly disposed polar group portions 902. In the latter mechanism, the ion transport is not affected by the segment motion, accordingly the temperature dependence of the ion transport is small, and the ion transport film is expected to have a large ion transport capacity even at low temperatures. Further, in the ion transport film of the present invention, the polar group portions are oriented, in the side chains, so as to be perpendicular or approximately perpendicular to the basal plate, and hence particularly efficient ion transport can be expected in the film thickness direction.

Although introduction of polar functional groups is not essential for the ion transport film of the present invention, the ion conductivity is expected to be improved by introducing polar functional groups. No particular limitation is imposed on such polar functional groups, and examples of such polar functional groups include cyclic or chain polyethers such as crown ethers and alkylene ethers, and ionic substituents such as sulfonic acid groups and ammonium salts.

In the ion transport film of the present invention, by introducing polar sites, such as a crown ether ring, having affinity to an ion having a specific size, there is formed a structure in which the polar sites are laminated from the upper surface to the lower surface of the film. In this structure, the carrier ions migrate in a direction from the upper surface to the lower surface of the film in a manner hopping over the polar sites arranged with approximately even intervals, and the ion transport film is expected to be an ion transport film that is efficient and high in anisotropy for ions having a specific size.

Conceivably, in the helical substituted polyacetylene film into which there are introduced chain polar sites each having a repeated structure of an alkylene oxide such as methylene oxide, ethylene oxide or propylene oxide, the adjacent side chains 901 enclose one of carrier ions 903, as shown in FIG. 9, so as to form a pseudo crown ether ring, and consequently the ions are transported on the basis of the same mechanism as described above. Such a pseudo crown ether ring allows easy variation of the ring size, and accordingly can transport various ion species. Additionally, such a pseudo crown ring structure is lower in ion trapping capability as compared with crown ether rings, hence ion transfer is expected to occur relatively rapidly, and a rapid ion transport can be expected.

The materials in the present invention may be used as mixtures with metal salts. Examples of the usable metal salts include alkali metal salts such as lithium salts, sodium salts and potassium salts and transition metal salts such as copper complexes and nickel complexes; among these, lithium metal salts such as $LiClO_4$ are preferably used. When the materials contain a substituent to be dissociated into anions, such as a sulfonic acid group, a carboxylic acid group and a phosphoric acid group, the ion transport film of the present invention can be expected to carry out rapid ion transport as a conductor of a cation such as proton. On the other hand, when the materials contain a substituent to be dissociated into cations, such as an ammonium salt, the ion transport film of the present invention can be expected to carry out rapid ion transport as an anion conductor.

Although as substances to exhibit oxygen enriching ability, metal complexes, fluorine compound, silicon-containing polymers and the like have hitherto been known, there are very few substances satisfying a high separation coefficient and a high permeability coefficient.

In general, when the gas separation coefficient is made larger, the structure in the film becomes denser, and hence the gas permeability coefficient is decreased.

Figure 10:
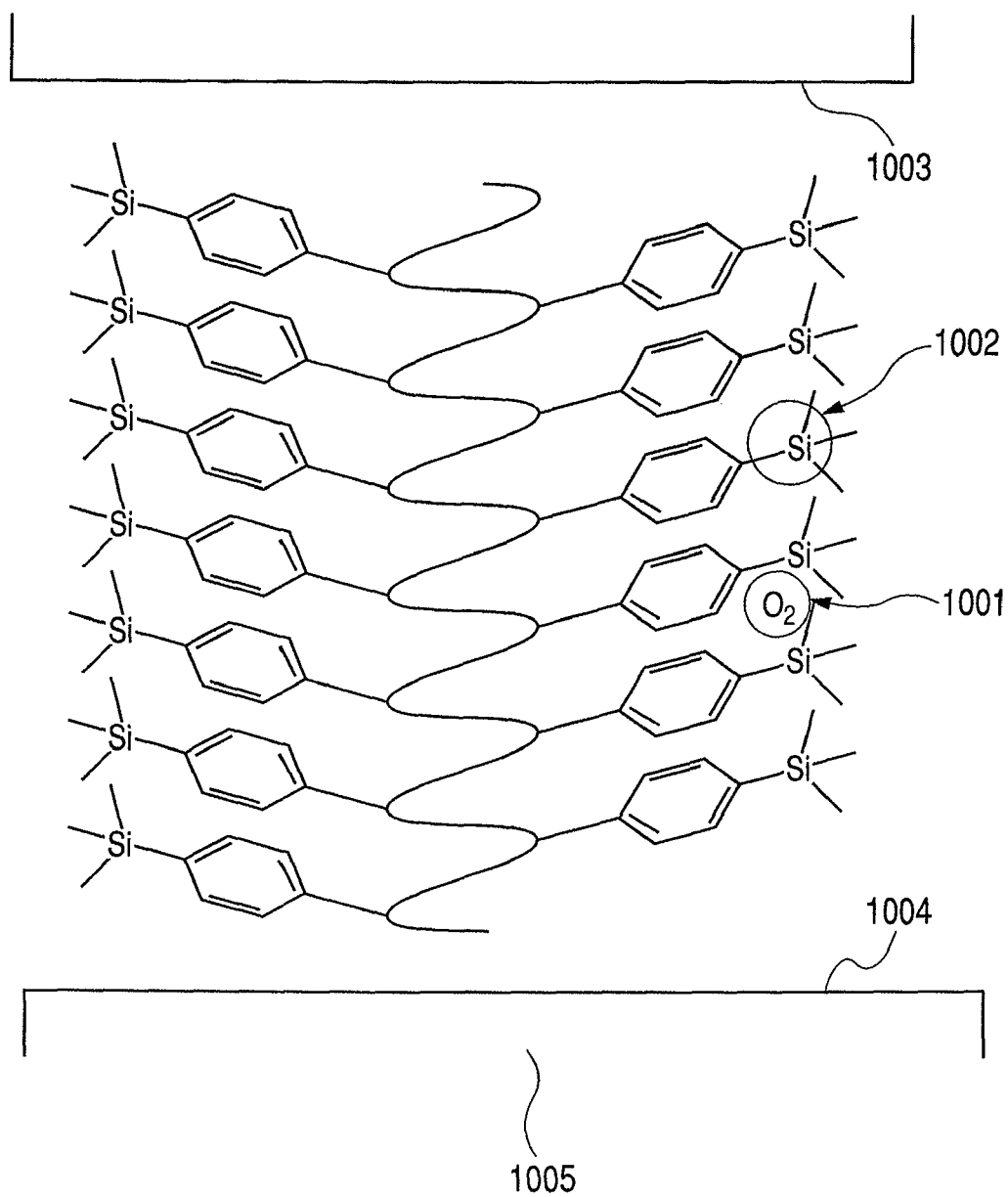
FIG. 10 is a schematic view illustrating an embodiment of a gas separation film of the present invention.

Although introduction of sites having affinity to oxygen is not essential for the gas separation film of the present invention, the oxygen permeability coefficient is expected to be improved by introducing sites having affinity to oxygen. In this gas separation film, as illustrated in FIG. 10, there is formed a structure in which oxygen-philic sites 1002 are laminated from the upper surface 1003 to the lower surface 1004 of the film, and a structure is expected to be formed in which the conduction paths of oxygen gas 1001 penetrate in the film thickness direction. In this structure, a gas separation mechanism operates particularly efficiently in the film thickness direction, and a large gas separation coefficient is expected to be exhibited.

No particular limitation is imposed on the oxygen-philic structure, and examples of such a structure include fluorine-containing substituents such as a fluoroalkyl group, and silicon-containing substituents such as a trialkylsilyl group.

In the gas separation film of the present invention, by introducing sites having affinity to oxygen such as a fluorine-containing substituent such as a fluoroalkyl group or a trialkylsilyl group, there is formed, as illustrated in FIG. 10, a structure in which oxygen-philic sites 1002 are laminated perpendicular or approximately perpendicular to a substrate 1005. In this structure, oxygen molecules 1001 migrate in a direction from the upper surface 1003 to the lower surface 1004 of the film in a manner hopping over the oxygen-philic sites 1002 arranged straightly, and the gas separation film is expected to be a gas separation film that is efficient for oxygen.

Additionally, by introducing around the oxygen-philic sites flexible sites having optional lengths such as an alkyl group, the free volume size is controlled, and thus the gas separation film is expected to be a gas separation film in which a high separation coefficient and a high permeability coefficient are compatible with each other.

The helical substituted polyacetylene film in which the oxygen-philic sites are regularly laminated allows to consider a possible mechanism which further improves the affinity to oxygen by surrounding the oxygen molecule with side chains adjacent to each other, and thus a higher gas separation capacity can be expected.

EXAMPLES

Hereinafter, examples of the device structure in the present invention are described.

Example 1

Present Example is an example of a fundamental structure of a functional polymer film in which poly(p-2-ethylhexyla-midophenylacetylene) is used.

(Growth Polymerization from Basal Plate)

In a test tube sealed after pressure reduction and replacement of the air in the test tube with nitrogen, 0.01 mol of rhodium (norbornadiene) chloride dimer and 4 mL of toluene as a solvent are placed, stirred for about 10 minutes, and then 5 mL of a toluene solution of 1-mercaptooctylphenyl-1',2-diphenylvinyllithium, represented by the following formula 2a, having a concentration of $1 \times 10^{-3}$ mol/L is poured into the test tube. Thereafter, 0.1 mol of triphenylphosphine and 1 mL of toluene are poured into the test tube, and stirred at 0° C. for 2 hours to yield a toluene solution of [rhodium(norbornadiene)(1-mercaptohexylphenyl-1',2-diphenylvinyl)(triphenylphosphine)] complex represented by the following formula 2b.

(formula 2a)

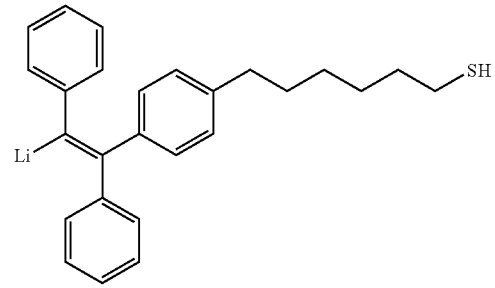

(formula 2b)

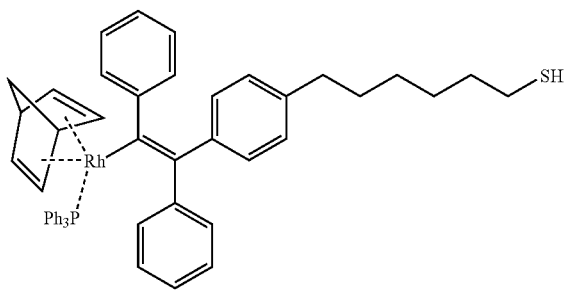

A test tube in which a gold basal plate is placed is sealed after replacement of the air in the test tube with nitrogen, and then the above-obtained toluene solution of the rhodium complex is added to the test tube. The test tube is allowed to stand still at room temperature for 1 hour, thereafter the catalyst solution is removed, and the content of the test tube is washed with toluene. Once again, in the test tube containing the gold basal plate and being sealed after replacement of the air in the test tube with nitrogen, a 0.2 mol/L toluene solution of p-2-ethylhexylamidophenylacetylene represented by the following formula 3 is added. The test tube is allowed to stand still at room temperature for 2 hours, then the solution is removed, the content of the test tube is washed with toluene and then dried under reduced pressure to yield a poly(p-2-ethylhexylamidophenylacetylene) film produced on the gold basal plate. The inclination angle between the main helical axis of the polyacetylene and the surface of the substrate is 60 degrees or more.

By vapor depositing gold on the upper surface of the obtained polyacetylene film, a device structure of the polyacetylene film sandwiched by the gold electrodes can be produced.

(formula 3)

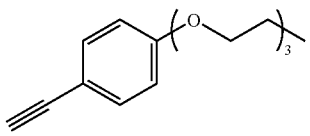

Example 2

Block Polymer

In a test tube sealed after pressure reduction and replacement of the air in the test tube with nitrogen, 0.1 mol of triphenylphosphine, 0.01 mol of rhodium (norbornadiene) chloride dimer, 5 mL of toluene as a solvent, and then 5 mL of a toluene solution of 1,1',2-triphenylvinyllithium, having a concentration of $1 \times 10^{-3}$ mol/L are poured into the test tube. Thereafter, the content of the test tube is stirred at 0° C. for 2 hours to yield a toluene solution of [rhodium(norbornadiene)(1,1',2-triphenylvinyl)(triphenylphosphine)] complex.

In a test tube sealed after pressure reduction and replacement of the air in the test tube with nitrogen, 10 mL of toluene solution of the [rhodium(norbornadiene)(1,1',2-triphenylvinyl)(triphenylphosphine)] complex having a concentration of $1 \times 10^{-3}$ mol/L is placed, and 10 mL of a toluene solution of p-2-ethylhexylamidophenylacetylene having a concentration of 0.5 mol/L is added in the test tube, and then stirred at 20° C. for 1 hour. Further, 10 mL of a toluene solution of p-methyltriethyleneoxidephenylacetylene represented by the following formula 4 having a concentration of 0.5 mol/L is added in the test tube, and stirred further for 1 hour. The polymer solution thus obtained is washed with methanol and filtered, and then dried under vacuum to yield poly((p-2-ethylhexylamidophenylacetylene)-co-(p-methyltriethyleneoxidephenylacetylene)) containing hydrophobic blocks and hydrophilic blocks.

(formula 4)

(Production of a Device Structure by the LB Method)

The block copolymer, containing hydrophobic blocks and hydrophilic blocks, obtained above is dissolved in chloroform to prepare a solution having a concentration of 0.5 mg/mL.

Figure 11A:
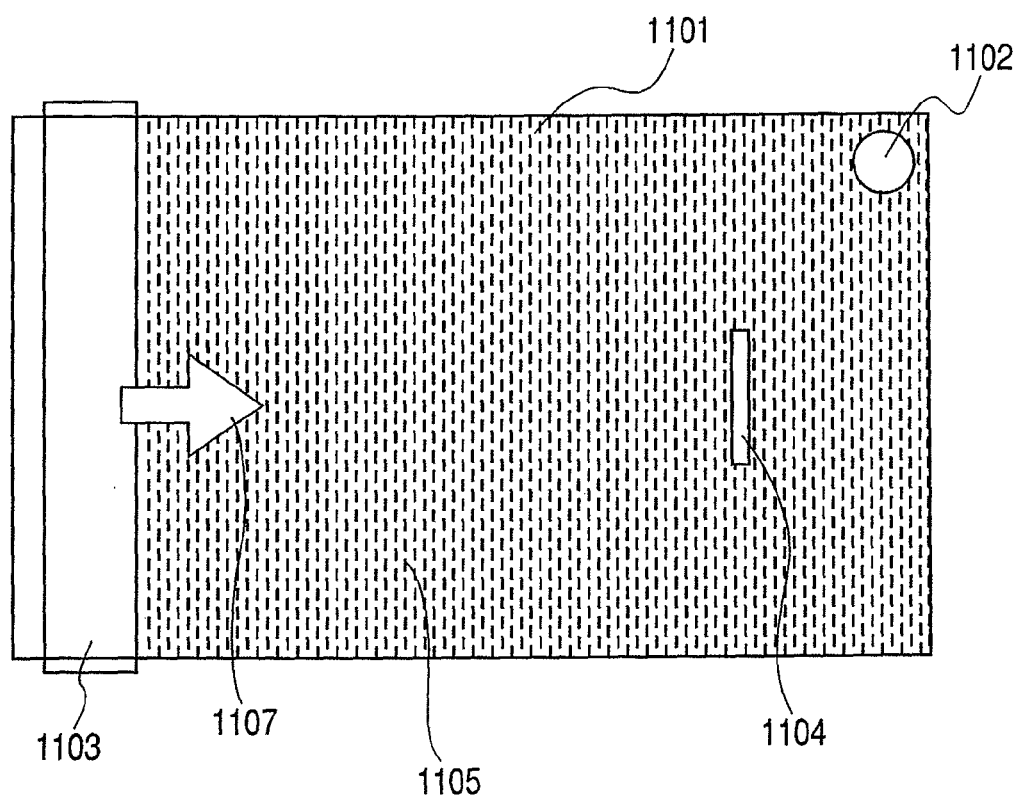
FIG. 11A and FIG. 11B are schematic views illustrating a spread film of the helical substituted polyacetylene obtained by spreading on a water surface, FIG. 11B illustrating a section of FIG. 11A.
Figure 11B:
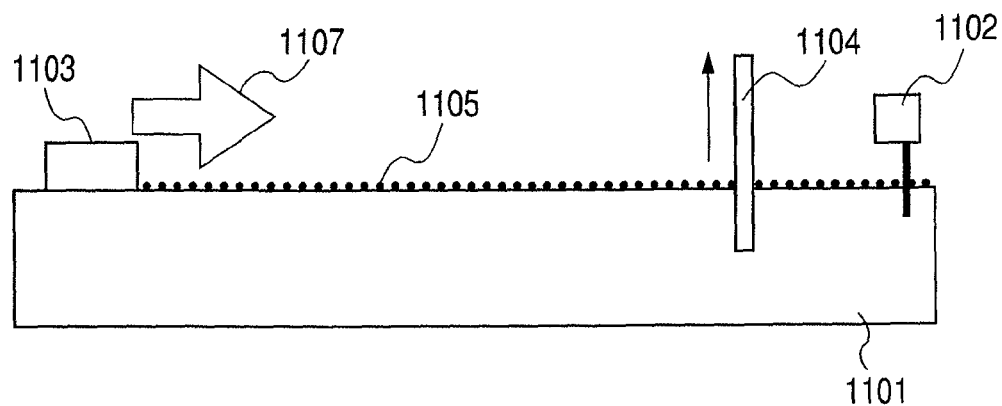

This solution (500 µL) is added dropwise at a rate of 2 µL/sec onto the surface of an ultra-pure water filled in a water trough 1101 (40-cm wide), shown in FIG. 11B, having an initial surface area of 2700 cm² under the condition that a movable barrier 1103 is located at the leftmost end, and after completion of the dropwise addition, the movable barrier 1103 is moved in a sense indicated with an arrow 1107 and the position of the movable barrier 1103 is regulated such that a film pressure gauge 1102 indicates a value of 25 mN/m. Thus, a spread film 1105 of the helical substituted polyacetylene is prepared on the water surface.

Next, a glass basal plate 1104 (FIGS. 11A and 11B) of 2 cm in narrow side and 2.5 cm in wide side with a platinum electrode vapor deposited thereon is beforehand inserted beneath the water surface spread film 1105 in the water trough 1101, and the glass basal plate 1104 is raised at a rate of 0.3 mm/sec so as to transfer the spread film 1105 onto the glass basal plate 1104. Thus, a polymer film oriented perpendicular to the glass basal plate is obtained. By repeating this transfer, a multilayer film in which the polyacetylene molecules are laminated in, for example, 1,000 layers is obtained. In this film, the inclination angle between the main helical axis of the polyacetylene and the surface of the substrate is 60 degrees or more.

The inclination angle between the main helical axis of the polyacetylene and the surface of the substrate is obtained as follows.

An AFM image of the basal plate with the polymer film attached thereto is measured to determine the height difference between the basal plate and the polymer film. Thus, the thickness (d) of the polymer film can be calculated.

From the thickness (d) of the polymer film, the length (l) of the block polymer and the lamination number (n), the inclination angle (θ) between the basal plate and the block polymer is determined with the following formula.

$$\theta = \cos^{-1}(d/l \cdot n)$$

The length (l) of the block copolymer is determined as follows.

The block copolymer is dissolved in chloroform to prepare a solution having a concentration of 0.01 mg/mL. This solution is applied onto a clean mica basal plate by applying a spin coating method at 1,000 rpm for 30 seconds to obtain a mica basal plate with the block polymer dispersed thereon. An AFM image of this mica basal plate is measured to obtain an image in which the block polymer lies down, and the length of the polymer can be determined from the image thus obtained.

Example 3

Production of an Ion-Containing Film by a Growth-on-Basal-Plate Method

By using as a monomer, p-butyltriethyleneoxidephenylacetylene represented by formula 5, a polymer film is prepared on a gold basal plate in the same manner as in above-described Example 1. The poly(p-butyltriethyleneoxidephenylacetylene) film grown on the gold basal plate is mixed with a solution of lithium perchlorate in 10% equivalent amount relative to the repeating unit and is allowed to stand still for 2 hours. Thereafter, the solution remaining on the basal plate is removed, and the basal plate is washed with toluene and then dried to yield a lithium salt-containing poly(p-butyltriethyleneoxidephenylacetylene) film. The inclination angle between the main helical axis of the polyacetylene and the surface of the substrate is 60 degrees or more.

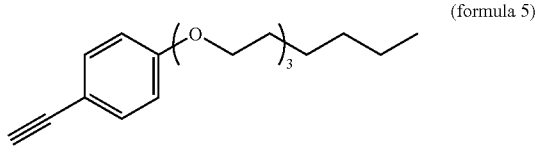

(formula 5)

Example 4

Evaluation of the Ion Transport Capacity

The block polymer multilayer film obtained in above-described Example 2 is immersed in a solution of lithium perchlorate of 10% equivalent relative to the number of the repeating units of the polymer, and is allowed to stand still for 2 hours. Thereafter, the solution remaining on the basal plate is removed and then the basal plate is dried to yield a lithium salt-containing block polymer film. A gold electrode is vapor deposited on the upper surface of the polymer film, a complex impedance measurement is carried out by varying the frequency between 0.1 Hz and 1 kHz, a Cole-Cole plot is prepared, and thus the film resistance is determined. From the film resistance, the inter-electrode distance and the sectional area of the film, the ion conductivity of the film can be determined with the following formula.

Ion conductivity=inter-electrode distance/(film sectional area×film resistance)

A comparison in terms of ion conductivity reveals that the polymer film obtained in Example 2 with perpendicular orientation is higher in ion transport capacity than a polyacetylene film with random orientation, having the same molecular structure and the same film thickness.

Example 5

Production of a Gas Separation Film by a Growth-on-Basal-Plate Method

In a test tube sealed after pressure reduction and replacement of the air in the test tube with nitrogen, a gold basal plate is placed, and a toluene solution of a rhodium complex represented by formula 6, [rhodium (norbornadiene)(1,1'-di(triethylaniline hydrochloride)-2-phenylvinyl)(triphenylphosphine)] complex, having a concentration of $1 \times 10^{-2}$ mol/L is added to the test tube. After completion of the reaction, the catalyst solution is removed, then the content of the test tube is washed with toluene, and thereafter a toluene solution of p-trimethylsilylphenylacetylene represented by formula 7, having a concentration of 0.2 mol/L is added to the test tube. After completion of the reaction, the phenylacetylene solution is removed, the content of the test tube is washed with toluene and then dried to yield poly(p-trimethylsilylphenylacetylene) with one terminal modified with 1,1'-di(triethylaniline hydrochloride)-2-phenylvinyl.

A film of the thus obtained terminal-modified polymer is formed in the same manner as in above-described Example 2 by using as the basal plate a polyethersulfone film in place of the glass basal plate, and thus a poly(p-trimethylsilylphenylacetylene) film oriented on the basal plate is obtained. The inclination angle between the main helical axis of the polyacetylene and the surface of the substrate is 60 degrees or more.

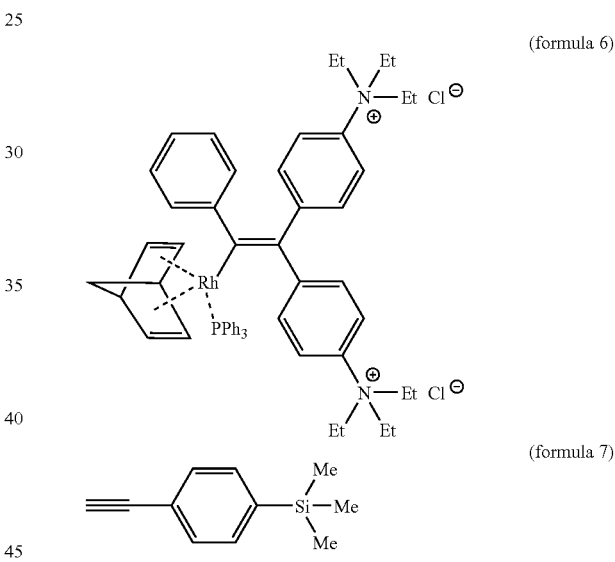

Example 6

Evaluation of Gas Separation Capacity

By using as a boundary film the polymer film obtained in above-described Example 5, two closed spaces are partitioned. A gas (for example, oxygen) to be measured is placed in one space under a certain pressure set to be higher than atmospheric pressure, and the other space is set to have atmospheric pressure. The gas in the test pressure space permeates through the film, and hence a pressure sensor on the permeation side senses the pressure increase due to the permeating gas; by this pressure increase, the piston of a cylinder operates under the control of a permeation amount measurement controller so as for the pressure in the permeation side space to be constantly at atmospheric pressure; and the product between the displacement magnitude of the piston and the sectional area of the piston gives the amount of the gas having permeated through the film. When the gas permeation amounts of oxygen and nitrogen are measured by using the same film and by setting the same measurement time, the oxygen/nitrogen separation coefficient can be calculated with the following formula.

Gas separation coefficient=gas permeation amount (ml) of oxygen/gas permeation amount (ml) of nitrogen A comparison in terms of this separation coefficient reveals that the polymer film obtained in Example 5 with perpendicular orientation is higher in oxygen/nitrogen gas separation capacity than a polyacetylene film with random orientation, having the same molecular structure and the same film thickness.

The helical substituted polyacetylene structure of the present invention can be applied to highly efficient device structures in which a linear polymer is disposed between electrodes, ion transport films having sufficient ion conductivities even at low temperatures and gas separation films to efficiently separate gases in the film thickness direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-060936, filed Mar. 9, 2007, which is hereby incorporated by reference herein in its entirety.

What is claimed is:

1. A helical substituted polyacetylene structure comprising a substrate and a substituted polyacetylene with a periodic main chain having a helical periodic structure,
wherein the substituted polyacetylene is disposed inclined on a surface of the substrate in such a manner that the inclination angle between the main helical axis of the substituted polyacetylene and the surface of the substrate falls in a range of 60° or more and 90° or less.

2. A device structure comprising a first electrode, a substituted polyacetylene with the periodic main chain having a helical periodic structure and a second electrode which are sequentially disposed on a substrate,
wherein the substituted polyacetylene is disposed inclined in such a manner that the inclination angle between the main helical axis of the substituted polyacetylene and the surface of the substrate falls in a range of 60° or more and 90° or less.

3. An ion transport film comprising the substituted polyacetylene structure according to claim 1.

4. The ion transport film according to claim 3, wherein a substituted polyacetylene in which polar sites are introduced into the side chains is used.

5. A gas separation film comprising the substituted polyacetylene structure according to claim 1.

6. The gas separation film according to claim 5, wherein a substituted polyacetylene in which fluorine-containing functional groups or silicon-containing functional groups are introduced into the side chains is used.

7. A method for producing the helical substituted polyacetylene structure according to claim 1 comprising the steps of:
forming a molecular spread film in which a substituted polyacetylene with a periodic main chain having a helical periodic structure is spread inclined on a water surface in such a manner that the inclination angle between the main helical axis of the substituted polyacetylene and the water surface falls in a range of 60° or more and 90° or less; and
transferring the substituted polyacetylene to the substrate from the molecular spread film.

8. A method for producing the helical substituted polyacetylene structure according to claim 1 comprising the step of:
polymerizing a monomer in a direction in which a substituted polyacetylene with a periodic main chain having a helical periodic structure is disposed inclined in such a manner that the inclination angle between the main helical axis of the substituted polyacetylene and the surface of the substrate falls in a range of 60° or more and 90° or less.

9. A method for producing the helical substituted polyacetylene structure according to claim 1 comprising the step of:
polymerizing a monomer, by using as a catalyst a rhodium complex bonded to the surface of a substrate, in a direction in which a substituted polyacetylene with a periodic main chain having a helical periodic structure is disposed inclined in such a manner that the inclination angle between the main helical axis of the substituted polyacetylene and the surface of the substrate falls in a range of 60° or more and 90° or less.

* * * * *